United States Patent Office 2,805,123
Patented Sept. 3, 1957

2,805,123

PROCESS FOR PRODUCING AMMONIUM NITRITE

Logan C. Bostian, Morris Plains, N. J., assignor to Allied Chemical & Dye Corporation, New York, N. Y., a corporation of New York No Drawing. Application January 7, 1954,
Serial No. 402,803

12 Claims. (Cl. 23—104)

This invention relates to the production of ammonium nitrite and more particularly to an improved method for making this compound directly by the reaction of an aqueous solution of ammonium reactants with nitric oxide-containing gas mixtures having in excess of 80 volume percent inert gas (on an anhydrous and ammonium-free basis) e. g. those produced by the catalytic combustion of ammonia-air mixtures; said gas mixtures are hereinafter referred to as dilute nitrous gases.

One of the principal uses of ammonium nitrite is in the production of hydroxylamine compounds. For such work it is usually unnecessary to isolate the nitrite from aqueous solution.

The nitrite-producing operation using dilute nitrous gas and ammonium reactants can be considered as a type of gas absorption including physical absorption of gaseous elements by the ammonium reactant solution and stripping of volatile components from this solution, together with a multiplicity of gas phase and liquid phase reactions and side reactions. While the complexity and rapidity of what occurs during absorption may preclude exact knowledge of the chemical and physical mechanisms for the process, the following equations will serve as a guide for understanding the invention, using ammonium hydroxide for example as the ammonium reactant in the absorbing solution:

*Principal reactions*

(1) $$2NO + O_2 \underset{\text{elevated temperature}}{\overset{\text{reduced temperature}}{\rightleftarrows}} 2NO_2$$
nitric oxide    oxygen                 nitrogen dioxide (2) $$NO + NO_2 \rightleftarrows N_2O_3$$
                 nitrogen trioxide (3) $$N_2O_3 + H_2O \longrightarrow 2HNO_2$$
       water        nitrous acid (4) $$HNO_2 + NH_4OH \longrightarrow NH_4NO_2 + H_2O$$
            ammonium        ammonium
            hydroxide         nitrite A summation of the preceding equations can be written as follows:

(4a) $$4NO + O_2 + 4NH_4OH \longrightarrow 4NH_4NO_2 + 2H_2O$$

When the ammonium reactant in the aqueous absorbing solution is ammonium sulfite, a considerable quantity of ammonium hydroxylamine disulfonate can be made simultaneously with the ammonium nitrite. The equation for this reaction is as follows:

(5) $$3HNO_2 + 2(NH_4)_2SO_3 \longrightarrow 2NH_4NO_2 + HON(SO_3NH_4)_2 + H_2O$$
                    ammonium      ammonium      ammonium hydroxylamine disulfonate
                                   nitrite

*Side reactions*

(6) $$5NO_2 + 4NH_4OH \longrightarrow 3NH_4NO_3 + NH_4NO_2 + 2H_2O + NO$$
    nitrogen    ammonium      ammonium
    dioxide     hydroxide       nitrate (7) $$NH_4OH \longrightarrow NH_3 + H_2O$$
                   ammonia (8) $$4NH_3 + 4NO + O_2 \longrightarrow 4N_2 + 6H_2O$$
                               nitrogen (9) $$NH_4NO_2 \longrightarrow N_2 + 2H_2O$$

The rate of side reaction 6 is greatly increased under acid conditions. Side reaction 8 is believed to take place in the vapor phase. Side reaction 9 represents decomposition of ammonium nitrite with heat. In addition, when ammonium sulfite is the ammonium reactant in the absorbing solution, it can be oxidized to the sulfate.

An object of this invention is a greater yield of ammonium nitrite in a process for producing that compound by the direct absorption of a dilute nitrous gas.

Another object of this invention is a process for maintaining continuous or intermittent production of high quality ammonium nitrite solutions suitable for conversion to hydroxylamine compounds.

I have now discovered that side reactions in a direct absorption process for making ammonium nitrite from a dilute nitrous gas can be reduced by employing an absorbing solution having normality in the range from 0.01 to 0.5 with respect to the basic ammonium reactants therein.

Dilute nitrous gases which I may use for the practice of my invention can be obtained by catalytic combustion of ammonia-air mixtures, by electric arc combustion of air, by thermal fixation of the nitrogen in air, or as by-product gas from other chemical processes. Nitrous gases produced by catalytic combustion of ammonia-air mixtures are preferred because they are ordinarily the most economical for efficient practice of my invention. In particular the nitrous gases derived from combustion of ammonia-air mixtures having about 6 to 9 volume percent ammonia are especially preferred for their economy and efficiency in my absorption process. Such gases contain at the burner exit roughly 6 to 9.6 volume percent nitric oxide on an anhydrous and ammonia-free basis, together with more than sufficient oxygen to form ammonium nitrite (¼ mol of oxygen per mol of nitric oxide).

As shown in Equation 1 above, the reaction of nitric oxide and oxygen to form nitrogen dioxide is reversible with temperature. For this reason it is convenient to describe the quality of a particular nitrous gas feed by its stoichiometric nitric oxide content and its mol ratio of nitric oxide:nitrogen dioxide. The term "stoichiometric nitric oxide" as used herein includes nitric oxide combined with oxygen in the form of higher oxides of nitrogen thermally reversible to nitric oxide as well as free nitric oxide. In some cases the nitrous gas supply may be deficient in oxygen for making the nitrite. In those cases molecular oxygen, conveniently air, can be added to the nitrous gas prior to or during the absorption process to make up the oxygen deficiency.

If the nitrous gas is fed to the absorption operation when the nitrogen oxides in it are principally nitrogen dioxide, the side reaction represented by Equation 6 above tends to compete with the principal ammonium nitrite-forming reaction represented by Equation 4 above, thereby forming undesirable quantities of nitrate to the detriment of the nitrite yield and quality. For this reason I prefer that the nitrous gas entering the absorption operation have a nitric oxide:nitrogen dioxide mol ratio of at least 4:1. By quickly cooling an oxygen-rich nitrous gas from an ammonia burner it is possible to maintain desirably high nitric oxide-nitrogen dioxide ratios and reduce the cooling load of the absorption operation.

The absorption can be conducted in a single gas-to-liquid contacting stage or in a plurality of such stages wherein the gas is contacted successively in each stage with an absorbing solution and finally vented from the last stage. In the preferred absorption operation nitrous gas is contacted in a first stage wherein the ammonium reactant in the absorbing solution is maintained at high concentration, the normality of the ammonium reactant being as much as 0.8 or even higher. Then the gas is exhausted into a second stage wherein normality of the ammonium reactant in the absorbing solution is maintained at a lower value than is maintained in the absorbing solution of the first stage. Vent gas and ammonium nitrite product solution are withdrawn from the second stage or later stage, wherein normality is 0.01–0.5.

Absorbing contact can be effected between nitrous gas and the aqueous solution of ammonium reactant in a tower or other conventional gas-liquid contacting equipment. One of the most effective and economical ways for maintaining the absorbing contact between the gas and the liquid is to recirculate the bulk of the absorbing solution over tower packing countercurrent to or co-current with the nitrous gas stream, and to withdraw a portion of the rich solution containing ammonium nitrite incrementally or continuously as produced. To maintain the most efficient contact between the gas and liquid in a packed tower, I prefer to circulate sufficient liquid to keep the volumetric ratio of entering liquid-entering nitrous gas at least 0.1:1, based on the entering liquid being at 0° C. and the entering gas being anhydrous and ammonia-free at 100° C.

Temperature of the absorbing solution should be maintained below about 40° C. to prevent substantial decomposition of ammonium nitrite. In some cases it is expedient, particularly when ammonium sulfite is the ammonium reactant, to use temperatures as high as 35° C., but the yield is generally better when the temperature is maintained at about 0° C.

By basic ammonium reactants for use in my process I mean, for example, ammonium hydroxide—$NH_4OH$, ammonium sulfite—$(NH_4)_2SO_3$, an ammonium carbonate compound such as ammonium bicarbonate—$NH_4HCO_3$—or ammonium carbonate—$(NH_4)_2CO_3$, or mixtures of these compounds, all of which are basically-reacting in water solution. They are replenished gradually as the absorption proceeds to maintain normality of the solution in respect to the ammonium reactants therein between 0.01 to 0.5. In this range the absorption is a smoothly-running operation.

Maintenance of normality of the ammonium reactants above this range favors side reactions such as the oxidation of vapor phase ammonia represented by Equation 7, above, or when the ammonium reactants are in a large measure ammonium sulfite, oxidation of the sulfite to sulfate. Operation with absorbing solutions having normality of the ammonium reactants below this range leaves too little a reserve of these reactants to allow for minor fluctuations in the quality or quantity of the acidic nitrous gas flow. If pH is allowed to become acid, the side reaction shown in Equation 6, above, is apt to accelerate to such an extent that materials in process can decompose with virtually explosive violence. To maintain a margin of reserve ammonium reactants and alkalinity in the absorbing solution and still get the benefits of my invention, replenishment of the ammonium reactants can be accomplished so as to maintain normality of the solution in respect to ammonium reactants from 0.05 to 0.5.

When operating at about 0° C., I can maintain the necessary alkalinity and basic ammonium reactant concentration within the broad limits set forth above, in the case of ammonium hydroxide as the ammonium reactant, by the initial introduction into the absorbing solution of 0.02 to 2.0 grams of ammonia, e. g. in the form of anhydrous ammonia or a quantity of aqua ammonia proportional thereto, per liter of the solution and thereafter replenishing the solution with about 0.90 to 0.95 mol of ammonia per mol of stoichiometric nitric oxide fed; in the case of ammonium sulfite as the ammonium reactant, by the initial introduction of 5 to 25 grams of ammonium sulfite, e. g. in the form of the salt or ammonia and sulfur dioxide in quantities proportional thereto, per liter of the solution and thereafter replenishing with about 0.5 to 0.8 mol of ammonium sulfite per mol of stoichiometric nitric oxide fed; in the case of ammonium carbonate as the ammonium reactant, by the initial introduction of 5 to 24 grams of ammonium carbonate—$(NH_4)_2CO_3$— in the form of ammonia and ammonium bicarbonate or carbon dioxide in quantities proportional to said quantity of $(NH_4)_2CO_3$, or in the form of a quantity of the ammonium carbonate of commerce proportional to said quantity of $(NH_4)_2CO_3$, per liter of the solution and thereafter replenishing with about 0.5 to 0.8 mol of ammonium carbonate—$(NH_4)_2CO_3$—per mol of stoichiometric nitric oxide fed; and in the case of ammonium bicarbonate, by the initial introduction of 10 to 39.5 grams of ammonium bicarbonate, e. g. in the form of the salt or carbon dioxide and ammonia in quantities proportional thereto, per liter of the solution and thereafter replenishing it with about 1.0 to 1.2 mols of ammonium bicarbonate per mol of stoichiometric nitric oxide fed. When ammonium carbonate is fed to the process a large portion, if not all, of it is converted to the bicarbonate as the nitrite-forming reaction takes place. It is usually necessary to increase the reactant feed to the solution slightly when operating at higher temperatures to compensate for increased volatility losses.

For the entire process I prefer materials of construction which afford good corrosion resistance, e. g. glass, stainless steel, and aluminum.

The following examples show several ways in which my invention has been applied, but are not to be considered as limiting the invention.

*Example 1.*—Over a 30 hour period, 29.1 gram mols of ammonia, as a 9 volume percent mixture of ammonia in air, were catalytically burned at about 95% efficiency and essentially constant rate to produce a dilute nitrous gas having the following analysis in mol percent on an anhydrous and ammonia-free basis: 9.6 NO, 9.1 $O_2$, and 81.3 permanent gases principally nitrogen. The burner product gas was quickly cooled to about 105° C. in a tubular heat exchanger so as to maintain mol ratio of nitric oxide:nitrogen dioxide about 10:1, then continuously admitted near the base of a glass absorption tower. The volumetric gas flow rate (on an anhydrous and ammonia-free basis at 100° C.) was about 300 liters per hour.

The tower was 2.5 inches in internal diameter and 8 feet tall. It had a lean gas outlet at the top and was packed to a depth of 7 feet with ¼ inch Berl saddles. The packing was irrigated from the top at the rate of 150 liters per hour with an aqueous absorbing solution containing about 12% ammonium nitrite by weight, said solution having pH of 7.5 and normality in respect to ammonium reactants therein of 0.2. The absorbing solution flowed from the base of the tower into a sump wherein a solution containing 17.5 weight percent ammonium bicarbonate was gradually added at the average rate of 412 grams per hour to maintain pH of the absorbing solution from 7.3 to 7.6 and normality in respect to the ammonium reactants from 0.1 to 0.3 throughout the absorption operation. Average temperature of the absorbing solution was maintained at about 5° C. by use of a cooling coil in the sump. Temperature and pH of the absorbing solution were measured as it flowed from the base of the tower.

A product stream of 1050 grams per hour was withdrawn continuously from the main body of the circulated absorbing solution as it flowed out of the tower. The product stream contained 11.89% ammonium nitrite and 0.25% ammonium nitrate by weight. The yield of ammonium nitrite based on ammonia being fed to the catalytic burner was 79%.

*Example 2.*—11.97 mols of ammonia, as a 9 volume percent mixture of ammonia in air, were burned at 95% efficiency and essentially constant rate during a period of 12 hours to produce a dilute nitrous gas like that described in Example 1. The burner product gas was quickly cooled to 105° C. in a tubular heat exchanger so as to maintain a mol ratio of nitric oxide:nitrogen dioxide about 10:1, then continuously admitted near the base of the absorption tower described in Example 1. The volumetric gas flow rate (on anhydrous and ammonia-free basis at 100° C.) was about 300 liters per hour.

Absorbing solution, flowing at the rate of 150 liters per hour, entered the tower near the top, irrigated the packing, flowed from the base of the tower into the sump, and was pumped back to the tower. The initial charge of absorbing solution was made up by dissolving 20 grams of 97% pure ammonium sulfite monohydrate in 3.5 liters of water to obtain normality in respect to the ammonium reactant of 0.08. As absorption progressed a total of 1029 grams of 97% pure ammonuim sulfite monohydrate was added at frequent intervals to the absorbing solution in the sump, thereby establishing and maintaining pH between 7.2 and 9.8 and normality of the ammonium reactant between 0.2 and 0.4 in the absorbing solution. The absorbing solution was kept at about 5° C. by use of a cooling coil in the sump. Temperature and pH of the absorbing solution were measured as it flowed from the base of the tower.

At the end of the period, the operation was shut down and the equipment was drained. There resulted 5.25 liters of aqueous solution containing 4.70 gram mols ammonium nitrite, and 3.7 gram mols ammonium hydroxylamine disulfonate. The yield of free ammonium nitrite and that converted to ammonium hydroxylamine disulfonate was 70.2% based on ammonia fed to the catalytic burner.

Disulfonation of this solution could readily be completed at temperature from about 0°–5° C. by addition of ammonium bisulfite in about equal molar ratio with the ammonium nitrite still unreacted in the solution as determined by ultra-violet analysis, and finally adding sulfur dioxide in amounts in the range of 1–2 mols per mol of ammonium bisulfite employed, until pH is about 3.5

*Example 3.*—16.05 mols of ammonia, as a 9 volume percent mixture of ammonia in air, were burned at 95% efficiency and essentially constant rate during a period of 16 hours to produce a dilute nitrous gas like that described in Example 1. The burner product was quickly cooled to 100° C. in a tubular heat exchanger so as to maintain a mol ratio of nitric oxide:nitrogen dioxide about 10:1, then continuously admitted near the base of the absorption tower described in Example 1. The volumetric gas flow rate (on anhydrous and ammonia-free basis at 100° C.) was about 300 liters per hour.

Absorbing solution, flowing at the rate of 34 liters per hour, entered the tower near the top, irrigated the packing, flowed from the base of the tower into a sump, and was pumped back to the tower. The initial charge of absorbing solution was made up by dissolving 0.5 gram of ammonia in 3.0 liters of water to obtain normality in respect to the ammonium reactant of 0.01. As absorption progressed a total of 245 grams of ammonia was added at frequent intervals to the absorbing solution in the sump, thereby establishing and maintaining pH between 8.0 and 8.7 and normality of the ammonium reactant between 0.05 and 0.3 in the absorbing solution. The absorbing solution was kept at about 12° C. by use of a cooling coil in the sump. Temperature and pH of the absorbing solution were measured as it flowed from the base of the tower.

At the end of the period the operation was shut down and the equipment drained. There resulted 4250 grams of aqueous solution containing 12.44 percent ammonium nitrite. The yield of ammonium nitrite was 50% based on ammonia fed to the catalytic burner.

*Example 4.*—1.53 pounds per hour of ammonia as an ammonia-air mixture containing 9 volume percent ammonia are catalytically burned at about 95% efficiency to produce dilute nitrous gas having the following analysis in mol percent on an anhydrous and ammonia-free basis: 9.6 NO, 9.1 $O_2$ and 81.3 permanent gases, principally nitrogen. The nitrous gas is quickly cooled to about 150° C. in a tubular heat exchanger so as to maintain mol ratio of nitric oxide:nitrogen dioxide about 10:1, then continuously fed into an enclosed aluminum agitator tank 12" in diameter and 18" high. The agitator tank is filled with aqueous ammonium nitrite solution being stirred with a mixer. A portion of this solution is constantly being withdrawn from the bottom of the tank and recycled by pump on an external circuit through a refrigerated heat exchanger and back into the tank. 12 percent solution of ammonium carbonate, $(NH_4)_2CO_3$, in water, is introduced into the recycled solution at the rate of 50 pounds per hour and temperature of the recycled solution is maintained between 0° and 5° C. throughout the run.

Nitrous gas passes through a line near the top of the agitator tank into the base of a 2 ft. internal diameter by 12 ft. tall vented absorption tower made of aluminum and packed with 2" ceramic Raschig rings. The packing in the absorption tower is irrigated at the rate of 35 G. P. M. by aqueous ammonium nitrite irrigating solution which enters near the top of the tower, drains out a liquid-sealed leg at the base, flows into a 110-gallon sump refrigerated with submerged refrigerating coils, and is recirculated by pump back to the top of the tower. Unabsorbed gas is vented from the top of the tower. As the recycle ammonium nitrite solution to which ammonium carbonate is being added exceeds the volume of the agitator tank system, it overflows in the gas inlet line leading into the base of the absorption tower, this overflow of solution containing ammonium reactants mixing with the recirculated irrigating solution and being sufficient to maintain normality in said irrigating solution in respect to the ammonium reactants therein at about 0.37 throughout the run. pH of the irrigating solution is from 8.3 to 8.5 during the run, and temperature of the irrigating solution is maintained between 0° and 5° C. Volume of the irrigating solution in the sump is kept essentially constant by permitting a portion of irrigating solution to overflow from the sump to storage as ammonium nitrate product solution; the rate of ammonium nitrite product solution overflow is about 19.4 liters per hour. This solution contains about 102.5 grams per liter of ammonium nitrite and about 3.5 grams per liter ammonium nitrate, the ammonium nitrate being 3.3% of the ammonium nitrite produced. Ammonium nitrite concentration in the product solution is approximately 9¾% by weight. Yield of ammonium nitrite based on ammonia being fed to the catalytic burner is about 82%.

Maintenance of a nitrous gas feed composition with nitric oxide concentration from about 6 to 9.6 volume percent and nitrogen oxides being preponderantly nitric oxide as shown herein is disclosed and claimed in the copending patent application of Logan C. Bostian, George G. Joris, and Karl T. Nilsson, entitled Process for Producing Ammonium Nitrite, Serial Number 402,802, filed simultaneously herewith.

I claim:

1. In a process for producing ammonium nitrite by the reaction of a dilute nitrous gas, containing nitric oxide and nitrogen dioxide and at least 80% by volume of inert gas with an aqueous absorbing solution containing basic ammonium reactants, the improvement which comprises employing entering nitrous gas with at least 4:1 mol ratio of nitric oxide:nitrogen dioxide and employing absorbing solution having normality in the range from 0.01 to 0.5 with respect to the basic ammonium reactants therein.

2. The process defined in claim 1 wherein an ammonium carbonate compound is added to the aqueous absorbing solution to provide the basic ammonium reactant in said solution.

3. The process defined in claim 2 wherein the added ammonium carbonate compound is ammonium bicarbonate.

4. The process defined in claim 2 wherein the added ammonium carbonate compound is ammonium carbonate.

5. The process defined in claim 1, wherein ammonium hydroxide is the principal ammonium reactant in the aqueous solution.

6. The process defined in claim 1, wherein ammonium sulfite is the principal ammonium reactant in the aqueous solution.

7. A process for producing ammonium nitrite from the reaction of a dilute nitrous gas with an aqueous solution of ammonium reactants which comprises: circulating into absorbing contact with the nitrous gas, at a volumetric ratio of entering liquid: entering gas of at least 0.1:1, an aqueous solution at temperature below 40° C., the normality of which in respect to the ammonium reactants therein is maintained from 0.01 to 0.5 by replenishing said reactants incrementally, the entering nitrous gas having initial stoichiometric nitric oxide concentration, i. e. concentration of free nitric oxide and nitric oxide combined with oxygen in the form of higher oxides of nitrogen thermally reversible to nitric oxide, from about 6 to about 10 volume percent on an anhydrous and ammonia-free basis and nitric oxide:nitrogen dioxide mol ratio of at least 4:1; and withdrawing at least a portion of said aqueous solution containing ammonium nitrite.

8. The process defined in claim 7 wherein the ammonium reactants in the aqueous solution are replenished by addition of at least one ammonium carbonate compound and the normality of the ammonium reactants in said aqueous solution is maintained between 0.05 and 0.5.

9. The process defined in claim 8 wherein the ammonium carbonate compound added is ammonium bicarbonate.

10. The process defined in claim 8 wherein the ammonium carbonate compound added is ammonium carbonate.

11. The process defined in claim 7 wherein the principal ammonium reactant in the aqueous solution is ammonium hydroxide and the temperature of the solution is about 0° C.

12. The process as defined in claim 7 wherein the principal ammonium reactant in the aqueous solution is ammonium sulfite and the temperature of the solution is about 0° C.

References Cited in the file of this patent

UNITED STATES PATENTS

| 1,903,815 | Handforth | Apr. 18, 1933 |
| 2,032,699 | Hayes et al. | Mar. 3, 1936 |
| 2,467,274 | Shield et al. | Apr. 12, 1949 |
| 2,606,813 | Kahr | Aug. 12, 1952 |

FOREIGN PATENTS

| 9,884 | Great Britain | of 1910 |

OTHER REFERENCES

Chem. Abs., vol. 47 (4563–4564).